(12) United States Patent
Okumura

(10) Patent No.: US 9,610,848 B2
(45) Date of Patent: Apr. 4, 2017

(54) ONBOARD CHARGING SYSTEM AND CONTROL METHOD THEREOF

(71) Applicant: Kenichi Okumura, Gotenba (JP)

(72) Inventor: Kenichi Okumura, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/786,735

(22) PCT Filed: Apr. 22, 2014

(86) PCT No.: PCT/IB2014/000584
§ 371 (c)(1),
(2) Date: Oct. 23, 2015

(87) PCT Pub. No.: WO2014/174354
PCT Pub. Date: Oct. 30, 2014

(65) Prior Publication Data
US 2016/0075243 A1   Mar. 17, 2016

(30) Foreign Application Priority Data
Apr. 25, 2013 (JP) ................. 2013-092627

(51) Int. Cl.
*H02P 1/00* (2006.01)
*B60L 11/18* (2006.01)
(Continued)

(52) U.S. Cl.
CPC ........... *B60L 11/1809* (2013.01); *B60L 8/003* (2013.01); *B60L 11/1861* (2013.01);
(Continued)

(58) Field of Classification Search
CPC .. H02J 3/383; H01L 31/02021; Y02E 10/566; Y02T 10/7005
(Continued)

(56) References Cited

U.S. PATENT DOCUMENTS

2007/0125417 A1* 6/2007 Johanson ............ H01M 10/465
136/244
2009/0289589 A1* 11/2009 Fujino ..................... H02J 7/345
318/441

(Continued)

FOREIGN PATENT DOCUMENTS

JP          05-111112 A      4/1993
JP          07-123510 A      5/1995
JP       2011-083072 A      4/2011

*Primary Examiner* — Eduardo Colon Santana
*Assistant Examiner* — Gabriel Agared
(74) *Attorney, Agent, or Firm* — Sughrue Mion, PLLC

(57) ABSTRACT

An onboard charging system in which a main battery (3) is charged with generated power by a solar cell (2) after the generated power is stepped up in a voltage by a step-up converter (9) includes a step-up ratio calculating portion (62) configured to calculate a step-up ratio when stepping up the voltage with the step-up converter (9). The auxiliary battery (4) is set as a charging target battery if it is determined that the calculated step-up ratio is equal to or greater than the determination threshold value, and the main battery (3) is set as the charging target battery if it is not determined that the calculated step-up ratio is equal to or greater than the determination threshold value.

8 Claims, 3 Drawing Sheets

(51) Int. Cl.
*B60L 8/00* (2006.01)
*H02J 7/16* (2006.01)

(52) U.S. Cl.
CPC ............. *B60L 11/1868* (2013.01); *H02J 7/16* (2013.01); *B60L 2210/12* (2013.01); *B60L 2210/14* (2013.01); *B60L 2240/12* (2013.01); *Y02T 10/7005* (2013.01); *Y02T 10/7044* (2013.01); *Y02T 10/7066* (2013.01); *Y02T 10/7072* (2013.01); *Y02T 10/7083* (2013.01); *Y02T 10/7225* (2013.01); *Y02T 10/7233* (2013.01); *Y02T 90/127* (2013.01); *Y02T 90/14* (2013.01)

(58) Field of Classification Search
USPC ........................................................ 318/139
See application file for complete search history.

(56) References Cited

U.S. PATENT DOCUMENTS

| | | | | |
|---|---|---|---|---|
| 2010/0253140 | A1* | 10/2010 | Yamashita | B62D 5/0457 307/9.1 |
| 2011/0301790 | A1* | 12/2011 | Atluri | B60K 16/00 701/22 |
| 2014/0327306 | A1* | 11/2014 | Inoue | H02J 3/32 307/23 |

* cited by examiner

ONBOARD CHARGING SYSTEM AND CONTROL METHOD THEREOF

BACKGROUND OF THE INVENTION

1. Field of the Invention

The invention relates to an onboard charging system and a control method thereof.

2. Description of Related Art

Japanese Patent Application Publication No. 5-111112 (JP 5-111112 A), for example, describes technology in which, in an electric vehicle provided with a main battery that supplies power for driving an electric motor for running (hereinafter, simply referred to as a "running electric motor"), and an auxiliary battery that supplies power for driving auxiliaries, the battery to which power generated by a solar cell is to be charged is switched according to the output power of the solar cell.

With the technology described in JP 5-111112 A, the voltage of power generated by the solar cell is stepped up to 150 V, for example, to make the voltage appropriate for driving the running electric motor, and this power is then charged to the main battery. Also, Japanese Patent Application Publication No. 2011-083072 (JP 2011-083072 A), for example, describes an onboard electrical system that steps down voltage using a DC-DC converter that is connected to an auxiliary battery, and then supplies this stepped-down voltage to an auxiliary battery.

When stepping up the voltage of power that has been generated by a solar cell using a step-up converter and charging this power to a battery, converter efficiency decreases and power loss increases as a step-up ratio of the step-up converter increases, so it is desirable to suppress an increase in this step-up ratio. With the related art described in JP 5-111112 A above, the battery to be charged (hereinafter referred to as the "charging target battery") is selected according to the output power of the solar cell, so even if the output power is the same, the step-up ratio, and thus the power loss in the step-up converter, may increase.

For example, when comparing a first case in which the output power is 100 W, the voltage is 25 V, and the current is 4 A, with a second case in which the output power is 100 W, the voltage is 50 V, and the current is 2 A, when the voltage is stepped up to 200 V by a step-up converter, the step-up ratio in the first case is 8 and the step-up ratio in the second case is 2, so the step-up ratio, and thus the power loss, are higher in the first case.

SUMMARY OF THE INVENTION

The invention thus provides an onboard charging system and a control method thereof that can be used regardless of a rated output of a solar cell, and that is able to charge power from the solar cell while suppressing an increase in power loss in a step-up converter.

A first aspect of the invention relates to an onboard charging system including: a main battery that is charged with generated power that is power generated by a solar cell mounted in a vehicle, the solar cell generating power by being subjected to sunlight, and supplies the charged power to a running electric motor that is a drive source that drives the vehicle; an auxiliary battery that is charged with the generated power, and supplies the charged power to an auxiliary mounted in the vehicle; a step-up converter that steps up a voltage of the generated power to be charged to the main battery; a step-up ratio calculating portion configured to calculate a step-up ratio when stepping up the voltage with the step-up converter; a control switch that selects the main battery or the auxiliary battery as a charging target battery to be charged with the generated power; and a control portion configured to set the charging target battery based on the step-up ratio calculated by the step-up ratio calculating portion, and controls the control switch to select the set charging target battery. The control portion is configured to determine whether the step-up ratio is equal to or greater than a determination threshold value, as a determination process for setting the charging target battery, and sets the auxiliary battery as the charging target battery if it is determined that the step-up ratio is equal to or greater than the determination threshold value, and sets the main battery as the charging target battery if it is not determined that the step-up ratio is equal to or greater than the determination threshold value.

In this onboard charging system, the step-up ratio when stepping up the voltage with the step-up converter is calculated. If the calculated step-up ratio is equal to or greater than the determination threshold value, the generated power that is generated by the solar cell is not stepped up in voltage and is charged to the auxiliary battery. Therefore, when the step-up ratio is high, stepping up the voltage with the step-up converter is avoided, so an increase in power loss in the step-up converter is able to be suppressed. When the step-up ratio is low, the voltage of the generated power is stepped up by the step-up converter and this generated power is able to be charged. That is, it is possible to charge the generated power from the solar cell to the auxiliary battery without stepping up the voltage with the step-up converter when the step-up ratio is high such that the power loss of the step-up converter is large, and step-up the voltage with the step-up converter and charge the generated power from the solar cell to the main battery only when the step-up ratio is low such that the power loss from the step-up converter is small. Also, the charging target battery is set according to the step-up ratio regardless of the output power of the solar cell, so a system that can be used even if the specifications (rated output) of the solar cell are different is able to be realized.

The onboard charging system may further include a vehicle speed sensor that detects a vehicle speed. In this case, the control portion may be configured to determine whether the vehicle speed is equal to or less than a speed determination threshold value based on the vehicle speed detected by the vehicle speed sensor, and charge the generated power to the main battery without executing the determination process for setting the charging target battery if it is determined that the vehicle speed is equal to or less than the speed determination threshold value, and execute the determination process for setting the charging target battery if it is not determined that the vehicle speed is equal to or less than the speed determination threshold value.

For example, if the vehicle is stopped or traveling at a slow speed, a change in the power generating state by the solar cell is small and the necessity to switch the charging target battery is low, compared to when the vehicle is traveling at a high speed. Therefore, by charging the generated power from the solar cell to the main battery without executing a determination process for setting the charging target battery, it is possible to eliminate the need to both monitor the voltage in order to calculate the step-up ratio, and calculate the step-up ratio, so the power consumption of the system can be suppressed. On the other hand, while the vehicle is traveling, the power generating state by the solar cell changes due to a change in the direction in which the vehicle is heading, and the vehicle traveling through shade, and as a result, the step-up ratio changes. Therefore, the step-up ratio is calculated, and the charging target battery is set based on this calculated step-up ratio. Thus, the generated power is able to be charged while avoiding the voltage being stepped up by the step-up converter and suppressing an increase in power loss, according to a change in the power generating state by the solar cell.

The onboard charging system may further include a step-down converter that steps down the voltage of the generated power to be charged to the auxiliary battery. In this case, the generated power may be charged to the auxiliary battery after the voltage of the generated power is stepped down by the step-down converter. In this onboard charging system, the generated power is able to be charged to the auxiliary battery while suppressing power loss due to voltage reduction, by stepping down the generated power in voltage by the step-down converter.

A second aspect of the invention relates to a control method of an onboard charging system that includes a main battery that is charged with generated power that is power generated by a solar cell mounted in a vehicle, the solar cell generating power by being subjected to sunlight, and supplies the charged power to a running electric motor that is a drive source that drives the vehicle, and an auxiliary battery that is charged with the generated power, and supplies the charged power to an auxiliary mounted in the vehicle. The control method including: calculating a step-up ratio when stepping up a voltage of the generated power to be charged to the main battery by a step-up converter; determining whether the step-up ratio is equal to or greater than a determination threshold value, as a determination process for setting a charging target battery; setting the auxiliary battery as the charging target battery if it is determined that the step-up ratio is equal to or greater than the determination threshold value, and setting the main battery as the charging target battery if it is not determined that the step-up ratio is equal to or greater than the determination threshold value; and controlling the onboard charging system to charge the generated power to the set charging target battery. The control method of the onboard charging system may further include: determining whether a vehicle speed detected by a vehicle speed sensor is equal to or less than a speed determination threshold value based on the vehicle speed; and controlling the onboard charging system to charge the generated power to the main battery without executing the determination process for setting the charging target battery if it is determined that the vehicle speed is equal to or less than the speed determination threshold value, and executing the determination process for setting the charging target battery if it is not determined that the vehicle speed is equal to or less than the speed determination threshold value. The control method of the onboard charging system may further include: controlling the onboard charging system to charge the auxiliary battery after stepping down the voltage of the generated power with a step-down converter.

According to this aspect of the invention, an onboard charging system that can be used regardless of a rated output of a solar cell, and that is able to charge power while suppressing an increase in power loss, by charging the power to an auxiliary battery without stepping up the voltage of the power when the power loss in a step-up converter is large, is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment of an onboard charging system according to the invention will be described in detail with reference to the accompanying drawings.

Figure 1:
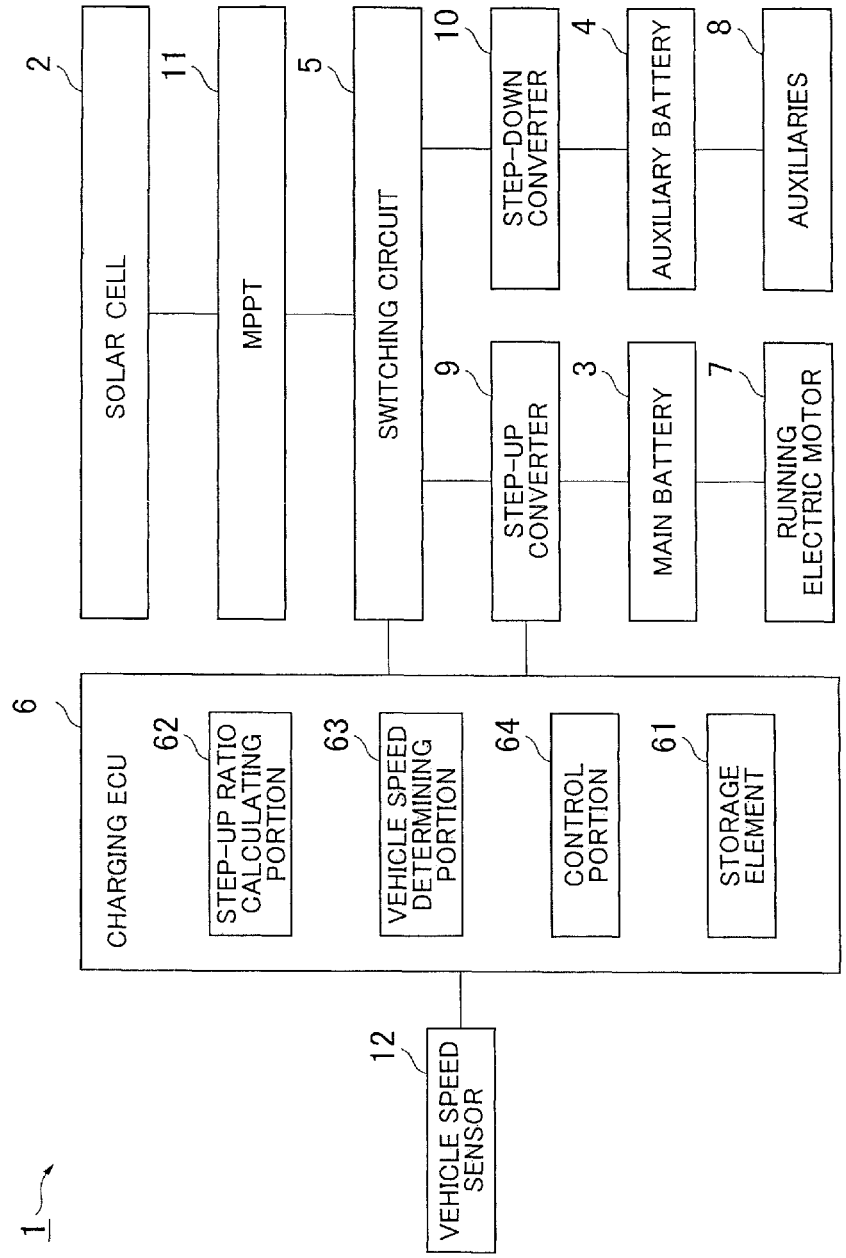
FIG. 1 is a block diagram of an onboard solar cell system according to one example embodiment of the invention.

A solar cell system (i.e., onboard charging system) 1 shown in FIG. 1 is mounted in an electric vehicle, for example, and switches a charging target battery to be charged with power generated by a solar cell 2 to either a main battery 3 or an auxiliary battery 4. The solar cell system 1 includes a switching circuit 5 for switching the charging target battery, and a charging Electronic Control Unit (ECU) 6.

The electric vehicle equipped with this solar cell system 1 is provided with a running electric motor 7 as a drive source for driving the vehicle. The electric vehicle is run by power that has been charged to the main battery 3 being supplied to the running electric motor 7. The electric vehicle is also provided with auxiliaries 8 that are driven by being supplied with power. These auxiliaries 8 include, for example, headlights, audio equipment, a car navigation system, and various ECUs and sensors and the like. These auxiliaries 8 are supplied with power that has been charged to the auxiliary battery 4.

The main battery 3 is provided with a plurality of battery modules, each of which includes a plurality of integrated battery cells. The plurality of battery modules are connected together in series to form a battery pack. The voltage of the main battery 3 is approximately 200 V, for example.

A step-up converter (DC-DC converter) 9 that steps up the voltage of power to be charged to the main battery 3 is connected to the main battery 3. The step-up converter 9 steps up the voltage of the power generated by the solar cell 2 to 200 V, for example, when charging the main battery 3. The step-up converter 9 is formed by a switching element and a diode and the like.

The auxiliary battery 4 includes a plurality of battery modules, each of which includes a plurality of integrated battery cells. The plurality of battery modules are connected together in series to form a battery pack. The voltage of the auxiliary battery 4 is approximately 12 V, for example. The auxiliary battery 4 is charged with power of a voltage (a second voltage) that is lower than the voltage (a first voltage) of the main battery 3.

A step-down converter (DC-DC converter) 10 that steps down the voltage of the power charged to the auxiliary battery 4 is connected to the auxiliary battery 4. The step-down converter 10 steps down the voltage of the power generated by the solar cell 2 to 12 V, for example, when charging the auxiliary battery 4. The step-down converter 10 is formed by a switching element and a diode and the like.

The solar cell 2 includes a solar cell cell that generates electricity by being subjected to sunlight, and is formed in a panel for example. The solar cell 2 is provided on a roof of the electric vehicle. The solar cell 2 may also be provided on a door or a bonnet (hood). The solar cell 2 may also be formed in a film, and may be provided on another portion of the vehicle body.

Figure 2A:
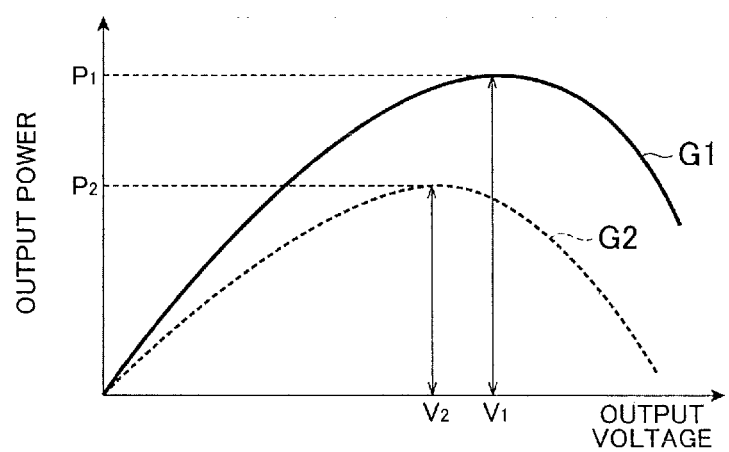
FIGS. 2A and 2B are graphs illustrating one example of a relationship between output power and output voltage of a solar cell.
Figure 2B:
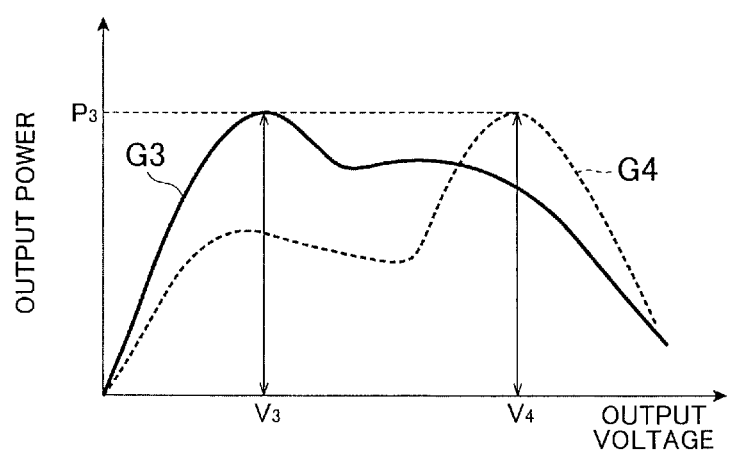

A Maximum Power Point Tracking (MPPT) circuit 11 (hereinafter simply referred to as "MPPT 11") that maximizes the output power by controlling the output voltage of the solar cell 2 is electrically connected to the solar cell 2. The MPPT 11 is a voltage control portion that maximizes the output power of the solar cell 2 by controlling the voltage, which is accomplished by changing the resistance. FIGS. 2A and 2B are graphs of relationships between the output voltage and the output power of the solar cell 2.

FIG. 2A is a view of a case in which the solar cell 2 is provided only on the roof and there is little change in the shape of the solar cell 2, for example. A curve $G_1$ indicated by the solid line in FIG. 2A illustrates a case in which power is generated by sunlight being received by the entire surface of the solar cell 2. A curve $G_2$ indicated by the broken line in FIG. 2A illustrates a case in which the solar cell 2 is in the shade and the output power is reduced.

With the curve $G_1$, the output power increases as the output voltage increases, and when the output voltage is $V_1$, the output power is a maximum value $P_1$. When the output voltage exceeds $V_1$, the output power decreases as the output voltage increases. When the output power from the solar cell 2 is indicated by the curve $G_1$, the MPPT 11 controls the output power to become the maximum value $P_1$ by adjusting the output voltage to $V_1$.

With the curve $G_2$, the output power increases as the output voltage increases, and when the output voltage is $V_2$ ($<V_1$), the output power is a maximum value $P_2$ ($<P_1$). When the output voltage exceeds $V_2$, the output power decreases as the output voltage increases. When the output power from the solar-cell 2 is indicated by the curve $G_2$, the MPPT 11 controls the output power to become the maximum value $P_2$ by adjusting the output voltage to $V_2$.

FIG. 2B is a view of a case in which the solar cell 2 is provided somewhere aside from the roof, such as on a door and a bonnet (hood) or the like, and has a curved surface shape, and the change in the shape is large. A curve $G_3$ indicated by the solid line in FIG. 2B illustrates a case in which the electric vehicle is traveling facing south, for example. A curve $G_4$ indicated by the broken line in FIG. 2B illustrates a case in which the electric vehicle is traveling facing northwest, for example. When the solar cell 2 has a curved surface and the change in the shape is large, the change in the output power with respect to the output voltage becomes complex compared to when the solar cell 2 is planar with little change in the shape. The change in the curves $G_3$ and $G_4$ is more complex than the change in the curves $G_1$ and $G_2$.

With the curve $G_3$, the output power increases as the output voltage increases, and when the output voltage is $V_3$ ($<V_2$), the output power is a maximum value $P_3$. When the output voltage exceeds $V_3$, the output power decreases as the output voltage increases. Beyond an inflection point that is a downward protrusion, the output power increases as the output voltage increases, and beyond an inflection point that is an upward protrusion, the output power decreases as the output voltage increases. When the output power from the solar cell 2 is indicated by the curve $G_3$, the MPPT 11 controls the output power to become the maximum value $P_3$ by adjusting the output voltage to $V_3$.

With the curve $G_4$, the output power increases as the output voltage increases. Beyond an inflection point that is an upward protrusion, the output power decreases as the output voltage increases, and beyond the inflection point that is a downward protrusion, the output power increases as the output voltage increases. When the output voltage is $V_4$ ($>V_3$), the output power is the maximum value $P_3$, and the output power decreases as the output voltage increases. When the output power from the solar cell 2 is indicated by the curve $G_4$, the MPPT 11 controls the output power to become the maximum value $P_3$ by adjusting the output voltage to $V_4$.

A switching circuit (control switch) 5 that is electrically connected to the solar cell 2 via the MPPT 11 has a semiconductor element such as an Insulated Gate Bipolar Transistor (IGBT), for example, and operates according to a signal output from the charging ECU 6. This switching circuit 5 switches a connecting target, and switches the charging target battery to either the main battery 3 or the auxiliary battery 4.

The charging ECU 6 is formed by a Central Processing Unit (CPU) that performs various calculations, Read Only Memory (ROM) and Random Access Memory (RAM) that form a storage element 61, an input signal circuit, an output signal circuit, and a power supply circuit and the like. In the charging ECU 6, the functions of a step-up ratio calculating portion 62, a vehicle speed determining portion 63, and a control portion 64 are realized by executing a program stored in the storage element 61. Various sensors and devices, such as a vehicle speed sensor 12, the MPPT 11, the switching circuit 5, the step-up converter 9, the step-down converter 10, and a battery sensor and the like, are electrically connected to the charging ECU 6. The battery sensor is connected to both the main battery 3 and the auxiliary battery 4, and detects a state-of-charge (SOC) and the like of both the main battery 3 and the auxiliary battery 4.

The storage element 61 stores various data. Examples of the data stored in the storage element 61 includes data related to control routines executed by the charging ECU 6, for example, data related to the voltage of the main battery 3, data related to the voltage of the auxiliary battery 4, data related to a step-up ratio of the step-up converter 9, data related to the SOC of the main battery 3, and data related to the SOC of the auxiliary battery 4, and the like.

The step-up ratio calculating portion 62 calculates a step-up ratio when stepping up the voltage with the step-up converter 9. The step-up ratio is a ratio of voltage after it is stepped up by the step-up converter 9 (hereinafter simply referred to as the "voltage after the step-up") to the voltage before it is stepped up by the step-up converter 9 (hereinafter simply referred to as the "voltage before the step-up"). The step-up ratio Q may be expressed by Expression (1) below.

$$Q = V_B / V_A \qquad (1)$$

Here, $V_A$ is the voltage before the step-up, and $V_B$ is the voltage after the step-up. For example, when the voltage $V_A$ before the step-up is 25 V, and the voltage $V_B$ after the step-up is 200 V, the step-up ratio Q is 8. When the voltage $V_A$ before the step-up is 50 V and the voltage $V_B$ after the step-up is 200 V, the step-up ratio is 4. The voltages $V_A$ and $V_B$ before and after the step-up may be calculated based on data related to a voltage value received from the step-up converter 9. Also, the voltage of the power charged to the main battery 3 is a constant value, so data related to the voltage value before the step-up by the step-up converter 9 may be received and the step-up ratio Q may be calculated.

Output voltage of the solar cell 2, output voltage of the MPPT 11, output voltage of the switching circuit 5, or input voltage of the step-up converter 9, for example, may be used as the voltage before the step-up. These voltage values may be actually measured values, or values calculated from another value.

The output voltage of the step-up converter 9 or the input voltage of the step-up converter 9 may be used as the voltage after the step-up. These voltage values may be actually measured values, values calculated from another value, or fixed values stored in the storage element 61.

The vehicle speed determining portion 63 determines the speed of the host vehicle based on a signal output from the vehicle speed sensor 12. The charging ECU 6 determines whether to execute a determination process (i.e., a determination routine) for setting the charging target battery, based on the speed of the host vehicle. This vehicle speed determining portion 63 determines whether the speed of the host vehicle is equal to or less than a speed determination threshold value, based on the speed of the host vehicle. The vehicle speed determining portion 63 may also determine whether the host vehicle is stopped, based on the speed of the host vehicle. A speed of 5 km/h, for example, may be used as the speed determination threshold value. The speed determination threshold value may alternatively be another value. The vehicle speed determining portion 63 may also determine the speed of the host vehicle only when an ignition is on, and determines that the host vehicle is stopped when the ignition is off.

The control portion 64 executes the determination routine for setting the charging target battery based on the step-up ratio. More specifically, the control portion 64 determines whether the step-up ratio is equal to or greater than a determination threshold value. If it is determined that the step-up ratio is equal to or greater than the determination threshold value, the control portion 64 sets the auxiliary battery 4 as the charging target battery. On the other hand, if it is not determined that the step-up ratio is equal to or greater than the determination threshold value, the control portion 64 sets the main battery 3 as the charging target battery. The control portion 64 controls the switching circuit 5 such that power is charged to the set charging target battery.

The control portion 64 sets the determination threshold value at 5, for example, and if the step-up ratio is equal to or greater than 5, the control portion 64 controls the switching circuit 5 to charge power to the auxiliary battery 4. If the step-up ratio is less than 5, the control portion 64 controls the switching circuit 5 to charge power to the main battery 3.

The determination threshold value is determined by the relationship between power loss (a decrease in converter efficiency) and the step-up ratio of the step-up converter 9. For example, when the converter efficiency is 90% when the step-up ratio of the step-up converter 9 is 2 to 3, and the converter efficiency is 80% when the step-up ratio is 5 to 10, the determination threshold value may be determined to be 5. By setting the determination threshold value at 5, when the step-up ratio is equal to or greater than 5, a step-up of the voltage by the step-up converter 9 is avoided, and power loss when the converter efficiency is equal to or less than 80% is reduced.

The control portion 64 determines whether to execute the determination routine for setting the charging target battery, based on the speed of the host vehicle. If it is determined that the vehicle speed is equal to or less than the speed determination threshold value, the control portion 64 determines not to execute the determination routine for setting the charging target battery. If it is not determined that the vehicle speed is equal to or less than the speed determination threshold value, then the control portion 64 executes the determination routine for setting the charging target battery.

Figure 3:
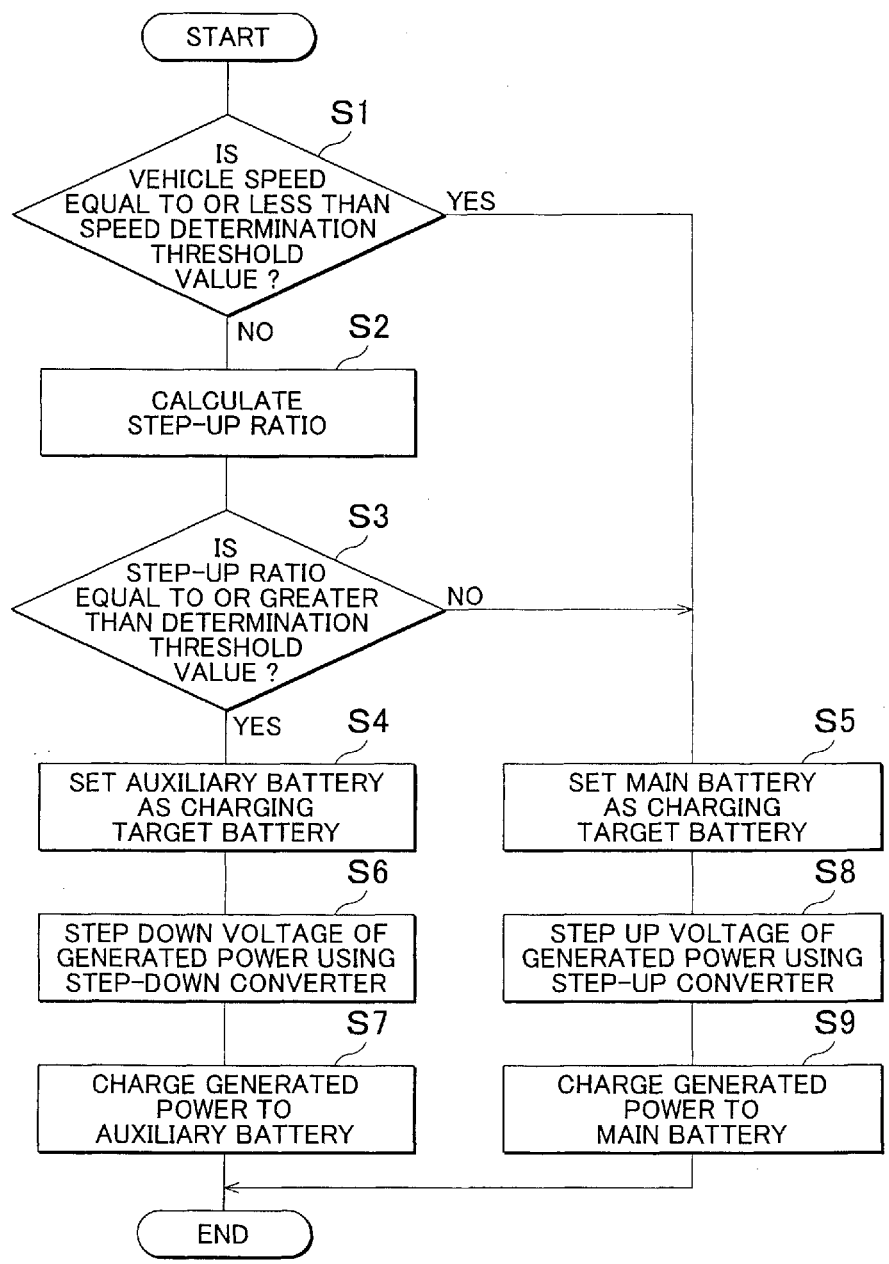
FIG. 3 is a flowchart illustrating a routine executed by the onboard solar cell system.

Next, a routine executed by the onboard solar cell system 1 will be described with reference to the flowchart shown in FIG. 3.

The vehicle speed determining portion 63 of the charging ECU 6 receives a signal from the vehicle speed sensor 12 and determines whether the speed of the host vehicle is equal to or less than the speed determination threshold value (step S1). If it is determined that the vehicle speed is equal to or less than the speed determination threshold value (i.e., YES in step S1), the process proceeds on to step S5. If the vehicle speed exceeds the speed determination threshold value, it is not determined that the vehicle speed is equal to or less than the speed determination threshold value (i.e., NO in step S1), and the process proceeds on to step S2.

In step S2, the step-up ratio calculating portion 62 of the charging ECU 6 receives a signal from the step-up converter 9 and calculates the step-up ratio. After calculating the step-up ratio, the process proceeds on to step S3 where the control portion 64 of the charging ECU 6 determines whether the step-up ratio is equal to or greater than the determination threshold value. If, it is determined that the step-up ratio is equal to or greater than the determination threshold value (i.e., YES in step S3), the process proceeds on to step S4. On the other hand, if the step-up ratio is less than the determination threshold value (i.e., NO in step S3), it is not determined that the step-up ratio is equal to or greater than the determination threshold value, and the process proceeds on to step S5.

In step S4, the control portion 64 sets the auxiliary battery 4 as the charging target battery. The switching circuit 5 switches the connecting target to the step-down converter 10 according to the signal output from the control portion 64. As a result, the solar cell 2, the MPPT 11, the switching circuit 5, the step-down converter 10, and the auxiliary battery 4 become electrically connected. Continuing on, in step S6, the step-down converter 10 steps down the voltage of the power generated by the solar cell 2 to 12 V, for example. This power that has been stepped-down in voltage is charged to the auxiliary battery 4 (step S7).

In step S5, the control portion 64 sets the main battery 3 as the charging target battery. The switching circuit 5 switches the connecting target to the step-up converter 9 according to the signal output from the control portion 64. As a result, the solar cell 2, the MPPT 11, the switching circuit 5, the step-up converter 9, and the main battery 3 become electrically connected. Continuing on, in step S8, the step-up converter 9 steps up the voltage of the power generated by the solar cell 2 to 200 V, for example. This power that has been stepped-up in voltage is charged to the main battery 3 (step S9).

Next, the operation of the onboard solar cell system 1 structured in this way will be described.

The solar cell 2 generates power by being subjected to sunlight. The MPPT 11 controls the voltage by changing the resistance, such that the output power of the solar cell 2 is the maximum. As a result, the output power of the solar cell 2 is maximized according to the power generating state of the solar cell 2. The switching circuit 5 switches the connecting target according to the signal output from the charging ECU 6. The charging ECU 6 determines whether the speed of the host vehicle is equal to or less than the speed determination threshold value, and if so (i.e., if the speed of the host vehicle is equal to or less than the speed determination value), the charging ECU 6 determines not to execute the determination routine for setting the charging target battery. If the vehicle is traveling at a slow speed or is stopped, the change in the generated power from the solar cell 2 is small, so the process for changing the charging target battery is not executed. As a result, the power consumption of the onboard solar cell system 1 is reduced by not executing the processes of monitoring the voltage value before the step-up and calculating the step-up ratio and the like. If the vehicle speed is equal to or less than the speed determination threshold value, the voltage of the power generated by the solar cell 2 is stepped up by the step-up converter 9, and this power is charged to the main battery 3.

If the vehicle speed exceeds the speed determination threshold value, the charging ECU 6 executes the determination routine for setting the charging target battery. The step-up ratio calculating portion 62 of the charging ECU 6 receives the voltage value before the step-up from the switching circuit 5, reads the voltage value of the main battery 3 that is stored in the storage element 61, and calculates the step-up ratio, for example.

The control portion 64 of the charging ECU 6 then sets the charging target battery based on the calculated step-up ratio. If the step-up ratio is equal to or greater than a determination threshold value, the power loss from the step-up converter 9 increases, so the generated power is not stepped up in voltage and is charged to the auxiliary battery 4. If the step-up ratio is less than the determination threshold value, the power loss from the step-up converter 9 is small, so the generated power is stepped up in voltage by the step-up converter 9, and is charged to the main battery 3.

The charging ECU 6 outputs a command signal to the switching circuit 5 to connect to the set charging target battery. The switching circuit 5 receives the command signal output from the charging ECU 6, selects either the main battery 3 or the auxiliary battery 4 as the charging target battery based on the command signal, and switches the connecting target to either the step-up converter 9 or the step-down converter 10.

If the step-up converter 9 is connected to the switching circuit 5, the step-up converter 9 steps up the voltage of the supplied power, and the main battery 3 is charged with the power that has been stepped-up in voltage. As a result, the power generated by the solar cell 2 is charged to the main battery 3.

The main battery 3 supplies the charged power to the running electric motor 7, and the running electric motor 7 is driven by the power supplied from the main battery 3 so as to run the electric vehicle.

On the other hand, when the step-down converter 10 is connected to the switching circuit 5, the step-down converter 10 steps down the voltage of the supplied power, and the auxiliary battery 4 is charged with the power that has been stepped-down in voltage. As a result, the power generated by the solar cell 2 is charged to the auxiliary battery 4.

The auxiliary battery 4 supplies the charged power to the auxiliaries 8, and the auxiliaries 8 are driven with the power supplied from the auxiliary battery 4 to execute various functions. For example, the power charged to the auxiliary battery 4 is used as power for illuminating headlights, power for operating audio equipment, power for operating a car navigation system, or power for operating various ECUs, or the like.

According to this kind of onboard solar cell system 1, the step-up ratio when stepping up the voltage with the step-up converter 9 is calculated. If the calculated step-up ratio is equal to or greater than the determination threshold value, the power generated by the solar cell 2 is not stepped up in voltage and is charged to the auxiliary battery 4, so use of the step-up converter 9 when the converter efficiency will decrease is able to be avoided. As a result, power loss in the step-up converter 9 is suppressed, so charging can be performed efficiently. Also, if the step-up ratio is less than the determination threshold value, the generated power is stepped up in voltage by the step-up converter 9 and is charged to the main battery 3. Therefore, the generated power can be stepped up in voltage using the step-up converter 9 and charged to the main battery 3 only when there is little decrease in efficiency. With this onboard solar cell system 1, the charging target battery is set according to the step-up ratio, irrespective of the output power of the solar cell 2, so charging can be performed while suppressing power loss, even if the rated output of the solar cell 2 is different.

Also, according to this onboard solar cell system 1, when the speed of the host vehicle is equal to or less than the determination threshold value, the determination routine for setting the charging target battery is not executed, so charging can be performed while suppressing power consumption related to the determination routine.

The onboard solar cell system 1 includes the step-down converter 10, and is able to perform charging while suppressing power loss, by reducing the voltage when charging power to the auxiliary battery 4.

The invention is not limited to the foregoing example embodiment. That is, various modifications such as those described below are also possible without departing from the scope of the invention.

In the example embodiment described above, the onboard solar cell system 1 is mounted in an electric vehicle, but the onboard solar cell system 1 may also be applied to another vehicle provided with a running electric motor, such as a hybrid vehicle or a fuel cell vehicle or the like.

Moreover, in the example embodiment described above, when charging power to the auxiliary battery 4, the voltage is stepped down using the step-down converter 10, but the onboard solar cell system 1 may also be configured without the step-down converter 10.

Also, in the example embodiment described above, power generated by the solar cell 2 is charged to the main battery 3 when the vehicle speed is equal to or less than the speed determination threshold value. Alternatively, however, power generated by the solar cell 2 may be charged to the auxiliary battery 4 when the vehicle speed is equal to or less than the speed determination threshold value.

Also, in the example embodiment described above, the determination routine for setting the charging target battery is cancelled when the vehicle speed is equal to or less than the speed determination threshold value. Alternatively, however, the determination routine for setting the charging target may be executed regardless of the vehicle speed.

Also, in the example embodiment described above, the determination routine for setting the charging target battery is cancelled when it is determined that fluctuation in the power generated by the solar cell 2 is small based on the vehicle speed, but the determination of whether to cancel the determination routine for setting the charging target battery may also be made based on host vehicle position information or the hour (time of day) or the like, for example.

Also, some or all of the processes executed in the charging ECU 6 may be executed by another ECU or the switching circuit 5. For example, the switching circuit 5 may receive data relating to the step-up ratio, and execute the determination process of determining whether the step-up ratio is equal to or greater than the determination threshold value.

Moreover, the onboard solar cell system 1 may also include a plurality of the auxiliary batteries 4 having different voltages, and may be configured to switch the charging target auxiliary battery 4 according to the step-up ratio.

The invention claimed is:

1. An onboard charging system comprising:
   a main battery that is charged with generated power that is power generated by a solar cell mounted in a vehicle, the solar cell generating power by being subjected to sunlight, and supplies the charged power to a running electric motor that is a drive source that drives the vehicle;
   an auxiliary battery that is charged with the generated power, and supplies the charged power to an auxiliary mounted in the vehicle;
   a step-up converter that steps up a voltage of the generated power to be charged to the main battery;
   a step-up ratio calculating portion configured to calculate a step-up ratio when stepping up the voltage with the step-up converter;
   a control switch that selects the main battery or the auxiliary battery as a charging target battery to be charged with the generated power; and
   a control portion configured to set the charging target battery based on the step-up ratio calculated by the step-up ratio calculating portion, and to control the control switch to select the set charging target battery, wherein
   the control portion is configured to determine whether the step-up ratio is equal to or greater than a determination threshold value, as a determination process for setting the charging target battery,
   the control portion is configured to set the auxiliary battery as the charging target battery when it is determined that the step-up ratio is equal to or greater than the determination threshold value, and
   the control portion is configured to set the main battery as the charging target battery when it is not determined that the step-up ratio is equal to or greater than the determination threshold value.

2. The onboard charging system according to claim 1, further comprising:
   a vehicle speed sensor that detects a vehicle speed, wherein
   the control portion is configured to determine whether the vehicle speed is equal to or less than a speed determination threshold value based on the vehicle speed detected by the vehicle speed sensor,
   the control portion is configured to charge the generated power to the main battery without executing the determination process for setting the charging target battery when it is determined that the vehicle speed is equal to or less than the speed determination threshold value, and
   the control portion is configured to execute the determination process for setting the charging target battery when it is not determined that the vehicle speed is equal to or less than the speed determination threshold value.

3. The onboard charging system according to claim 1, further comprising:
   a step-down converter that steps down the voltage of the generated power to be charged to the auxiliary battery, wherein
   the generated power is charged to the auxiliary battery after the voltage of the generated power is stepped down by the step-down converter.

4. A control method of an onboard charging system that includes a main battery, an auxiliary battery, and a step-up converter, the main battery being charged with generated power that is power generated by a solar cell mounted in a vehicle and supplying the charged power to a running electric motor, the solar cell generating power by being subjected to sunlight, the running electric motor being a drive source that drives the vehicle, and the auxiliary battery being charged with the generated power and supplying the charged power to an auxiliary mounted in the vehicle, the control method comprising:
   calculating a step-up ratio when stepping up a voltage of the generated power to be charged to the main battery by the step-up converter;
   determining whether the step-up ratio is equal to or greater than a determination threshold value, as a determination process for setting a charging target battery;
   setting the auxiliary battery as the charging target battery when it is determined that the step-up ratio is equal to or greater than the determination threshold value, and setting the main battery as the charging target battery when it is not determined that the step-up ratio is equal to or greater than the determination threshold value; and
   controlling the onboard charging system to charge the generated power to the set charging target battery.

5. The control method of the onboard charging system according to claim 4, further comprising:
   determining whether a vehicle speed detected by a vehicle speed sensor is equal to or less than a speed determination threshold value based on the vehicle speed; and
   controlling the onboard charging system to charge the generated power to the main battery without executing the determination process for setting the charging target battery when it is determined that the vehicle speed is equal to or less than the speed determination threshold value, and executing the determination process for setting the charging target battery when it is not determined that the vehicle speed is equal to or less than the speed determination threshold value.

6. The control method of the onboard charging system according to claim 4, further comprising:
   controlling the onboard charging system to charge the auxiliary battery after stepping down the voltage of the generated power with a step-down converter.

7. The onboard charging system according to claim 1, wherein, in response to the step-up ratio being equal to or greater than the determination threshold value, the generated power is not stepped up in voltage and is charged to the auxiliary battery.

8. The control method of the onboard charging system according to claim 4, wherein, in response to the step-up ratio being equal to or greater than the determination threshold value, the generated power is not stepped up in voltage and is charged to the auxiliary battery.

* * * * *